(12) United States Patent
Duncan et al.

(10) Patent No.: US 6,832,786 B2
(45) Date of Patent: Dec. 21, 2004

(54) TUBULAR MEMBER COUPLING DEVICE

(75) Inventors: Duane J. Duncan, Ransomville, NY (US); David W. Mielke, Jr., Ransomville, NY (US)

(73) Assignee: D.J. Mielke, Inc., Ransomville, NY (US)

( * ) Notice: Subject to any disclaimer, the term of this patent is extended or adjusted under 35 U.S.C. 154(b) by 0 days.

(21) Appl. No.: 10/642,840

(22) Filed: Aug. 18, 2003

(65) Prior Publication Data

US 2004/0087247 A1 May 6, 2004

Related U.S. Application Data

(63) Continuation-in-part of application No. 10/271,035, filed on Oct. 15, 2002, now Pat. No. 6,709,021, which is a continuation-in-part of application No. 09/981,578, filed on Oct. 16, 2001, now abandoned.

(51) Int. Cl.[7] .................................................. F16I 21/02
(52) U.S. Cl. ..................... 285/23; 285/109; 285/370; 285/424
(58) Field of Search ..................... 285/109, 23, 424, 285/370, 133.21, 397; 24/279, 20 TT, 274 R; 138/97

(56) References Cited

U.S. PATENT DOCUMENTS

| | | |
|---|---|---|
| 4,927,189 A | 5/1990 | Burkit |
| 5,201,550 A | 4/1993 | Burkit |
| D367,316 S | 2/1996 | Sonden et al. |
| D371,189 S | 6/1996 | Dharmasi et al. |
| D383,195 S | 9/1997 | Sonden et al. |
| D383,196 S | 9/1997 | Sonden et al. |
| D386,246 S | 11/1997 | Sonden et al. |
| 5,769,459 A | 6/1998 | Graf et al. |
| 6,030,005 A | 2/2000 | Andersson et al. |
| 6,062,610 A | 5/2000 | Andersson et al. |
| 6,073,977 A | 6/2000 | Schmidt-Hansen et al. |
| 6,709,021 B2 * | 3/2004 | Duncan et al. ............. 285/109 |

FOREIGN PATENT DOCUMENTS

| | | |
|---|---|---|
| DE | 1265514 | 4/1968 |
| DE | 2841572 | 4/1980 |
| EP | A2 0069098 | 1/1983 |
| SE | 317843 | 11/1969 |

* cited by examiner

*Primary Examiner*—Eric K. Nicholson
(74) *Attorney, Agent, or Firm*—Simpson & Simpson, PLLC

(57) ABSTRACT

A device for coupling tubular members including a sheet member having a first end and a second end where the first end and the second end are operatively arranged to overlap one another to form a substantially cylindrically shaped coupling, an abutment member mounted to the sheet member proximate the second end thereof, a male threaded member, a female member pivotably mounted proximate the first end of the sheet member and arranged for pivoting rotation about a pivot point, where the female member is arranged to threadably engage the threaded male member, and the male member is operatively arranged to abut the abutment member, wherein the male threaded member is operatively arranged to rotate in a first direction to abut the abutment member and expand the substantially cylindrically shaped coupling.

29 Claims, 9 Drawing Sheets

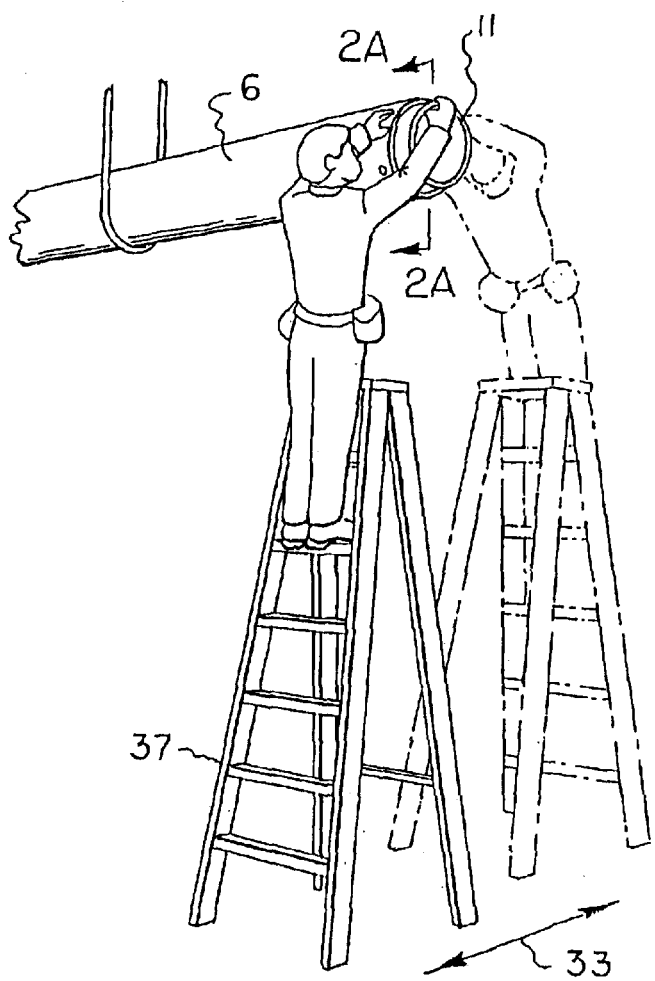
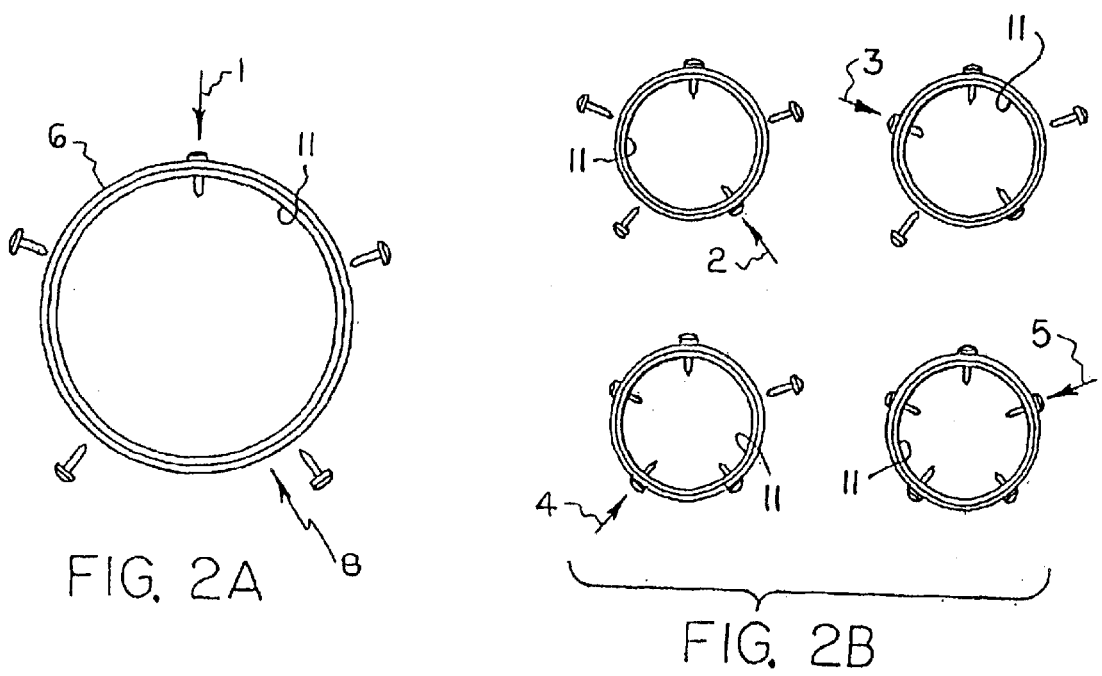
FIG. 1
PRIOR ART
FIG. 2A
FIG. 2B

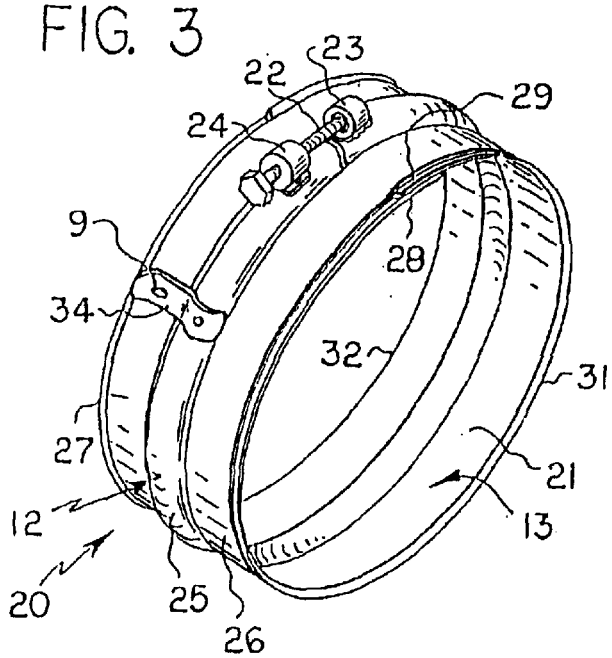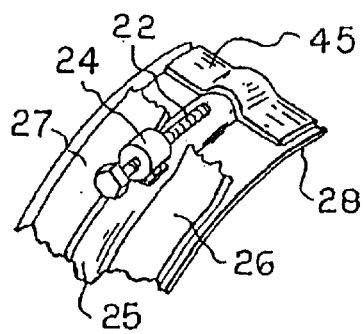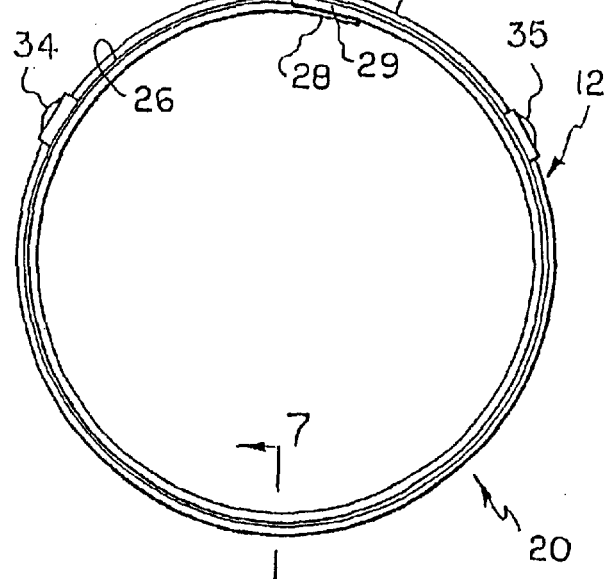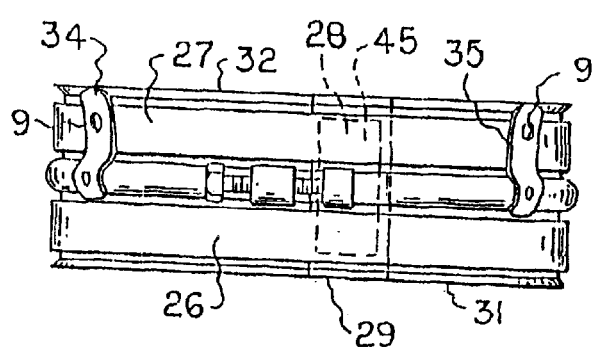

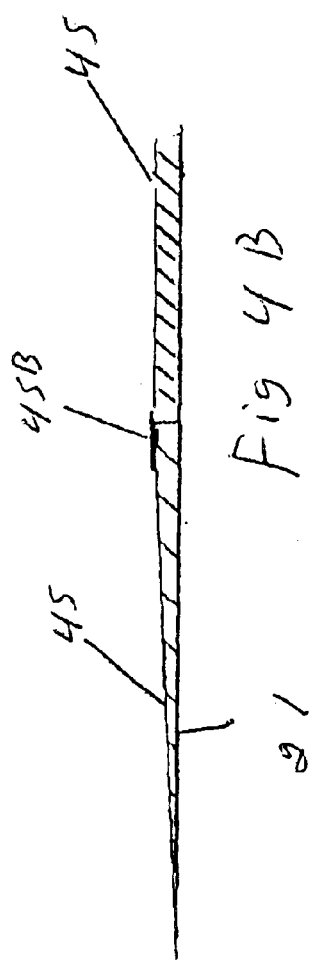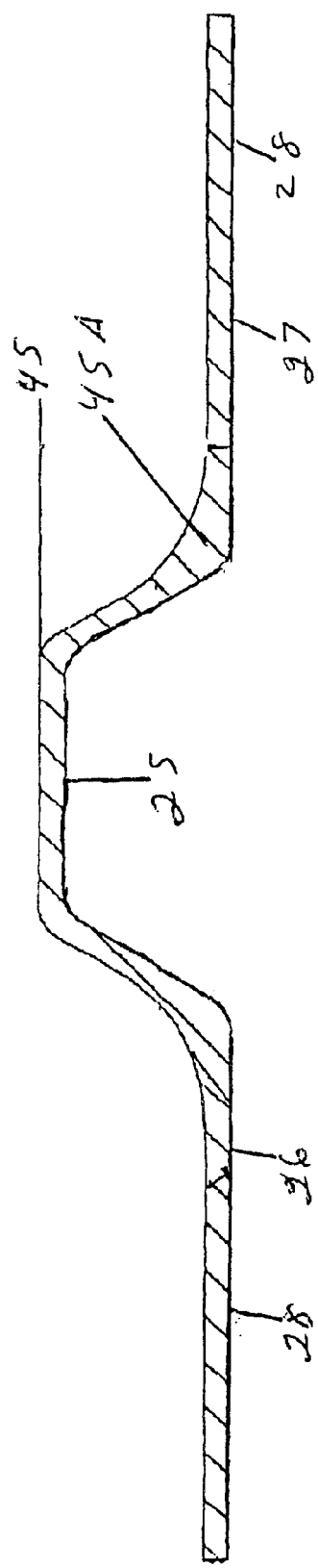

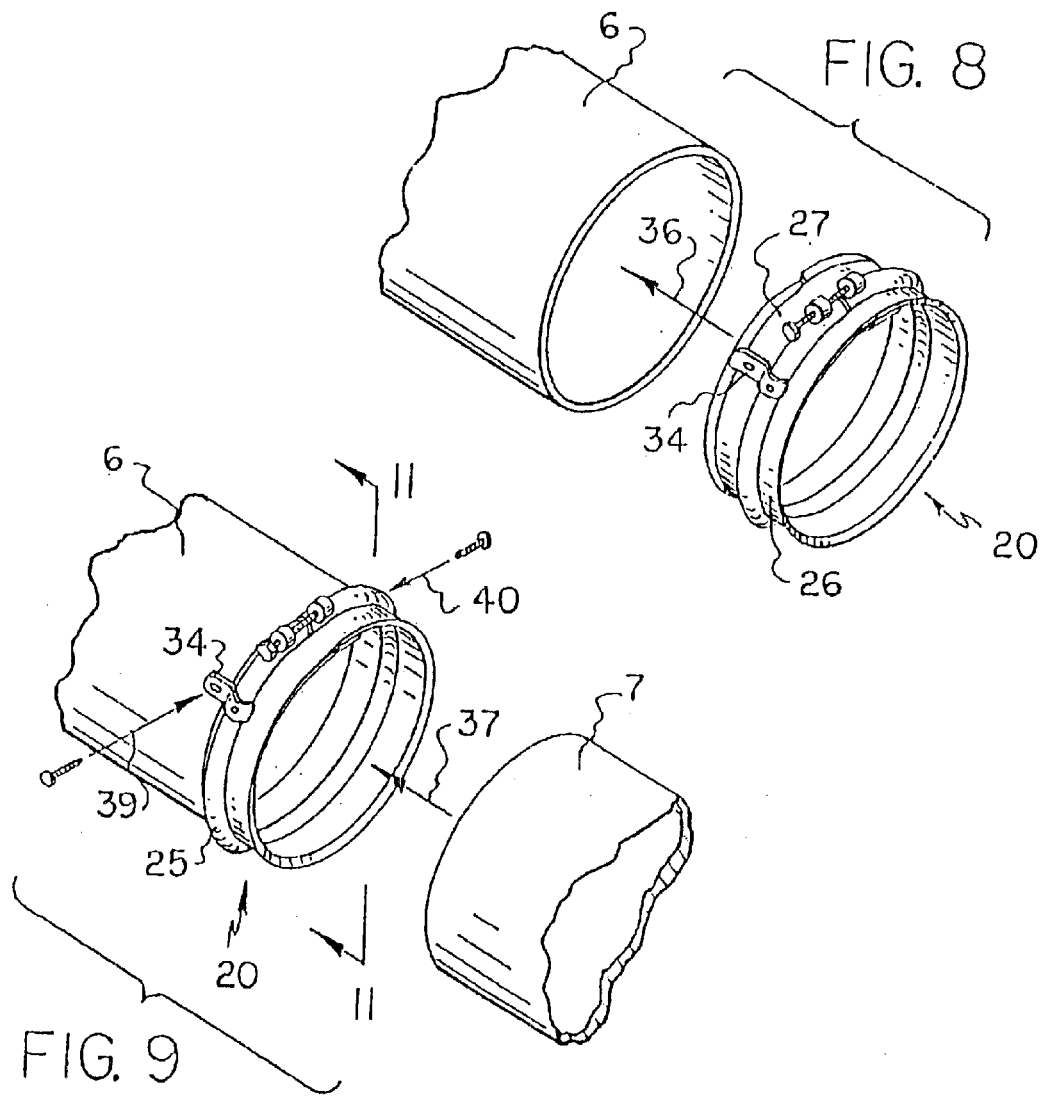
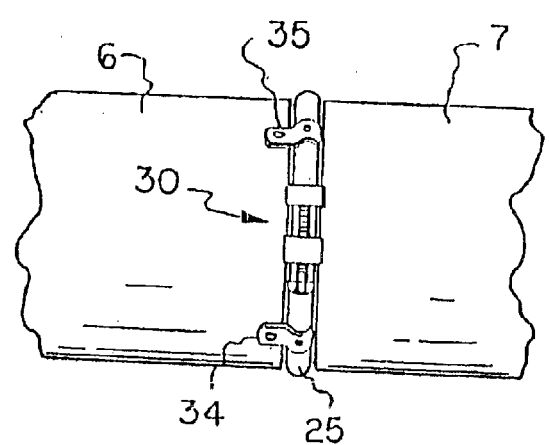

TUBULAR MEMBER COUPLING DEVICE

CROSS-REFERENCE TO RELATED APPLICATIONS

This application is a continuation-in-part of U.S. patent application Ser. No. 10/271,035 filed Oct. 15, 2002 now U.S. Pat. No. 6,709,021 which is incorporated by reference herein. U.S. patent application Ser. No. 10/271,035 is a continuation-in-part of U.S. patent application Ser. No. 09/981,578, filed Oct. 16, 2001, now abandoned, which is incorporated by reference herein.

FIELD OF INVENTION

The invention relates generally to coupling devices and, more specifically, to a device for coupling tubular members including a sheet member having a first end and a second end where the first end and the second end are operatively arranged to overlap one another to form a substantially cylindrically shaped coupling.

BACKGROUND OF THE INVENTION

Essentially, a typical joint for metal ducting (coupling a pair of aligned tubular members) is formed using two pipes with opposing ends of each pipe laid end-to-end, pushed together and then secured by the use of screws. By the nature of the product, particularly large metal ducting at high elevation, usually installed in ceilings, it has been very labor intensive and time consuming to join tubular members (where one person has to move a ladder back and forth from one side of the tubular member to the other, or two people using two ladders have to drive screws simultaneously into pipe). Thus, labor costs have a significant impact on this traditional manner of joining pipe. In addition to labor costs, often times this procedure causes the pipe to bend and does not provide a clean seal. There is the additional concern of alignment of large diameter pipe. As the pipe diameters increase, the range of tolerances also increases, which can result in "out of round" and "gap" conditions.

Expansion or contraction devices to hold the tubular members together are known in the art. One acknowledged problem is the difficulty of being able to force the coupling member into the tubular member to be joined, particularly with larger sized tubular members. Another problem encountered is that of holding coupling devices in place between tubular members (pipes, ducts, etc.) to be joined prior to and during expansion of the coupling.

One solution to this problem is taught in U.S. Pat. No. 4,927,189, which discloses an expanding coupling device that requires using two threaded members to effect expansion. This device consists of a cylindrical member where the ends of the sheet forming the tube overlap. In the preferred embodiment, the expansion of the device is effected by two threaded members, each affixed to the cylinder by straps that circumferentially encompass the cylinder. In other embodiments, the expanding device relies on a screw and socket assembly. This means that to expand the coupling device, the expansion device first must be pivoted into place and then a socket wrench must be employed to effect expansion. Conversely, to release the expanding device, the expansion device must first be loosened using a socket wrench and then pivoted up. This device requires the use of multiple straps that circumferentially encompass the cylinder and an expansion device that must be pivoted into place.

Various devices have been designed to accommodate the coupling of a pair of aligned tubular members. The invention disclosed in U.S. Pat. No. 5,769,459 (Graff et al.) relies on rubber coated, helical sleeves that are inserted inside of a pipe to seal a leak. The expandable sleeves are expanded by means of an inflatable air cushion or a mechanical mounting device. When the expanded sleeves come to rest against the inner pipe walls, sealing rings are installed. The sleeves are held in place by a pinion meshing with a row of teeth and a resilient locking bolt.

European Patent Application No. 0069098 (Andersson) teaches a cylindrical coupler with overlapping ends for extension and expansion of the coupling device. This invention teaches the use of triangular shaped lugs into which a screw is inserted. This device uses a sheet of rubber, or other resilient material, of such a length that before the coupling device is extended, the cloth resides on the surface of the device in folds that become unfolded as the device is expanded. This device is held in an unexpanded state by a steel band that extends circumferentially around the device. A weak point is built into the steel band so that when the device is expanded, the weak point breaks allowing for further expansion of the coupling device.

The internal expansion device disclosed by German Patent No. 28 41 572 (Schlimbach) includes two beads (or protuberances) on the outside, circumferential edges of the cylindrical device that are made to fit into mating recesses in the internal surface of the pipes that are being coupled. In this device, the edges of the cylinder do not overlap, but instead they seem to abut. Attached to the inside of the cylinder is an extra piece of material that is used to cover the opening made when the cylinder edges are moved away from each other as the cylinder is expanded to provide a coupling.

Disadvantages of the above-described devices include excessive internal diameter restrictions; difficulty in handling and manipulating; the requirement of special skills and/or tools to connect and disconnect; strict inside pipe diameter tolerances in order to form a sealed union; the lack of gasket sealing integrity under field conditions; failure under high internal pressures; and, a lack of flexibility.

Hence, there has existed a longfelt need for an improved coupling device for tubular members such as ducts and pipes.

SUMMARY OF THE INVENTION

The present invention generally comprises a device for coupling tubular members including a sheet member having a first end and a second end where the first end and the second end are operatively arranged to overlap one another to form a substantially cylindrically shaped coupling, an abutment member mounted to the sheet member proximate the second end thereof, a male threaded member, a female member pivotably mounted proximate the first end of the sheet member and arranged for pivoting rotation about a pivot point, where the female member is arranged to threadably engage the threaded male member, and the male member is operatively arranged to abut the abutment member, wherein the male threaded member is operatively arranged to rotate in a first direction to abut the abutment member and expand the substantially cylindrically shaped coupling, and at least one clip fixedly attached to an outer surface of the substantially cylindrically shaped coupling, in which the clip functions to hold the coupling device in engagement with the tubular members during coupling.

A general object of the present invention is to provide a coupling device that, when in the contracted condition can be easily inserted into pipe ends, and, when in an expanded condition provides a tight seal between adjacent pipes.

Another object of the present invention is to provide ease of assembly and disassembly.

Still another object of the present invention is to provide a coupling device that can be reused in its entirety.

Still a further object of the present invention is to provide a coupling device that is economical to manufacture and labor efficient to use.

Still another further object of the present invention is to provide a coupling device with one pivoting threaded member to effect expansion.

These and other objects, features and advantages of the present invention will become readily apparent to those having ordinary skill in the art upon a reading of the following detailed description in view of the appended claims and drawings.

BRIEF DESCRIPTION OF THE DRAWINGS

The nature and mode of operation of the present invention will now be more fully described in the following detailed description in view of the accompanying drawings wherein:

FIG. 1 is a perspective view illustrating the difficulty encountered in coupling tubular members using prior art devices;

FIG. 2A is an enlarged elevational end view of a tubular member connected by screws using a star pattern to a prior art cylindrical coupling joint taken generally along line 2A—2A in FIG. 1;

FIG. 2B is an elevational end view illustrating the prior art order of drilling screws;

FIG. 3 is a perspective view of the present invention;

FIG. 4 is a fragmentary perspective view showing the first sheet end of the sheet member of the present invention;

FIG. 4A is a cross section of FIG. 4 showing one embodiment of the overlap gasket sealing cover of the present invention;

FIG. 4B is a side view of the overlap gasket sealing cover extending along an outer surface of the present invention FIG. 5 is an end view of the present invention;

FIG. 6 is a top view of a preferred embodiment of the present invention shown in FIG. 3 that further illustrates the position of the first clip and the second clip;

FIGS. 7A and 7B are enlarged cross-sectional views of a preferred embodiment of the present invention taken generally along line 7—7 in FIG. 5;

FIG. 8 is a perspective view of the coupling device of the present invention being brought into position inside of a first tubular member;

FIG. 9 illustrates the coupling device positioned inside the first tubular member and arranged so that the first clip and the second clip are situated on the outside surface of the first tubular member;

FIG. 10 is a fragmentary top view of the tubular members coupled with the present invention;

DETAILED DESCRIPTION OF THE PREFERRED EMBODIMENT

Figure 3A:
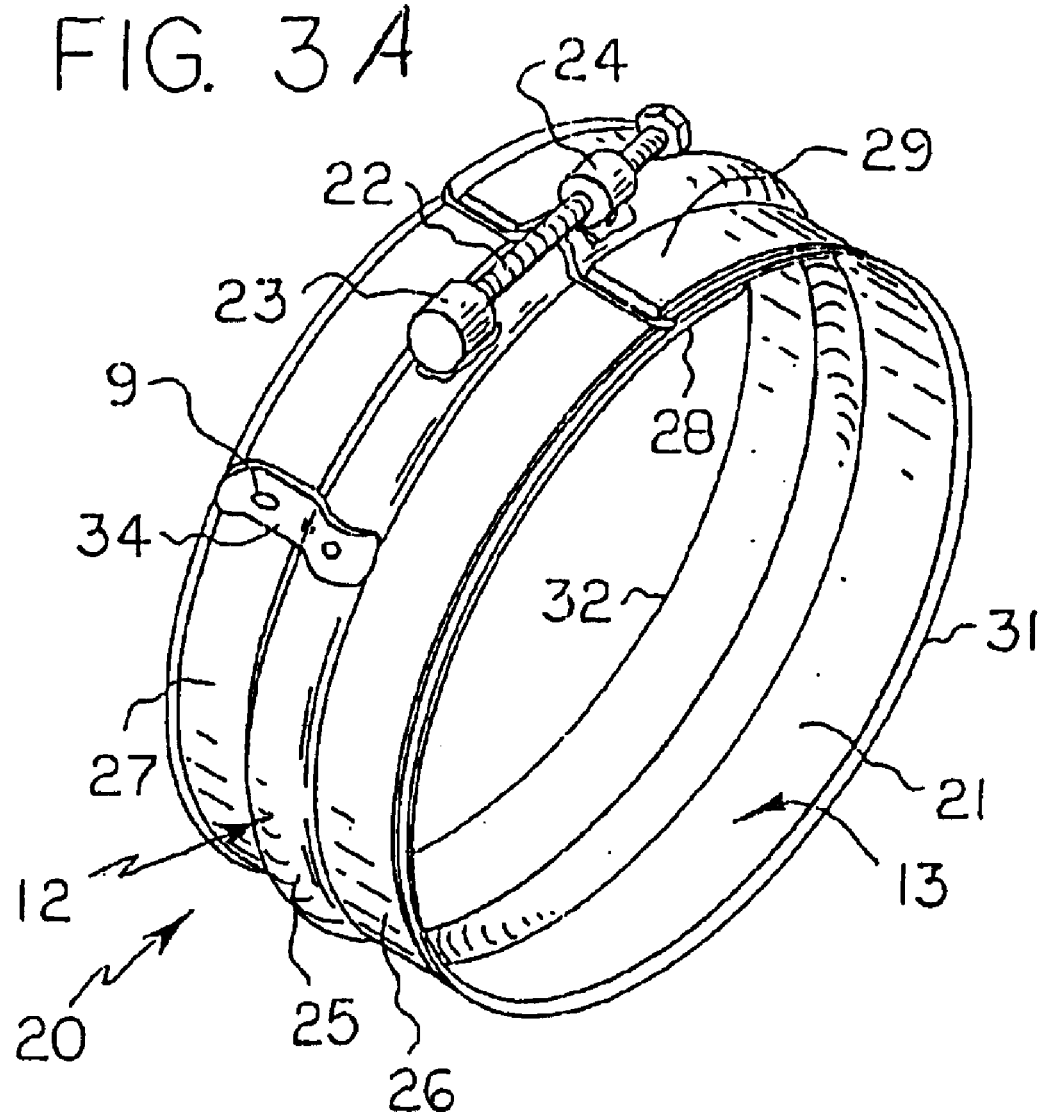
FIG. 3A is a perspective view of an alternate embodiment of the present invention.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. §112.

The present invention generally comprises a coupling device for coupling tubular members. In the description that follows, the phrase "tubular members" in intended to include pipes, ducts, tubes, conduit, and any other generally cylindrically shaped or oval-shaped articles of manufacture. A typical joint for metal ducting is formed using two pipes with opposing end of each pipe laid end-to-end, pushed together with a cylindrical coupling joint and then secured by the use of screws. One problem discovered therein is the inability for one person to do the job without moving the ladder from one side of the tubular member to the other. In addition, internal expansion devices have been used to couple tubular members in the past. The problem with prior art expansion devices is the difficulty encountered in positioning the coupling member into the tubular members to be joined, particularly with larger sized tubular members. Commonly, these couplings of large tubular members require two people to accomplish the joining of the tubular members efficiently. Still, another problem encountered is that once the internal expansion-coupling device of the prior art is pushed into the tubular member to be joined, it is difficult to hold it in the proper position prior to expansion. The tubular member coupling device of the present invention uniquely solves this problem in a way not contemplated by the prior art. The current invention allows a single person to connect tubular members efficiently from one side of the pipe, requiring tightening of only one threaded member.

Adverting now to the drawings, FIG. 1 is a perspective view illustrating the difficulty encountered in coupling tubular members using prior art devices. As depicted in FIG. 1, once cylindrical coupling joint 11 is placed over the open end of tubular member 6 and secured by driving screws into one side of cylindrical coupling joint 11, ladder 37 is moved in the direction of arrow 33 to accomplish the task of driving screws into the other side of cylindrical coupling joint 11 and tubular member 6. As this drawing illustrates, a single person must move from place to place on either side of the tubing to accomplish the coupling. The drawing illustrates a person first ascending ladder 37 on one side of the tubing, and then repositioning the ladder and ascending again from the other side (shown in phantom).

FIG. 2A is an enlarged elevational end view of tubular member 6 taken generally along line 2A—2A in FIG. 1 showing tubular member 6 connected to prior art cylindrical coupling joint 11 by screws using star pattern 8. FIG. 2A illustrates that, in the prior art method of coupling, location screws are commonly driven into cylindrical coupling joint 11 about the perimeter of the coupling to join tubular members. In the coupling process of the prior art, first tubular member 6 and second tubular member 7 (not shown) can bend and thus not provide a clean seal. To overcome the bending problem, it is common in the prior art to establish screw connections in an alternating order (similar to the order in which one might tighten the lug nuts of automobile wheel). FIGS. 2A and 2B illustrate by consecutively numbered arrows 1–5 the labor-intensive prior art order of tightening screws into the tubular members. It should be apparent, then, that the prior art method would require one person to move ladder 37 back and forth several times to alternatingly tighten the five screws into tubular member 6, and then, the same procedure would have to be repeated for tubular member 7.

FIG. 3 is a perspective view of the present invention. Coupling device 20 comprises sheet member 21 made from any relatively flexible sheet-like material having a first sheet end 28 and a second sheet end 29 where the sheet ends are operatively arranged to overlap one another to form sheet member 21 into a substantially cylindrically shaped coupling. In the preferred embodiment, the sheet is made of flexible steel. Also in the preferred embodiment, abutment member 23 is fixedly attached to sheet member 21 proximate second sheet end 29 and female member 24 is pivotably connected proximate first sheet end 28 of sheet member 21. Sheet member 21 includes first sheet side 31 and opposing parallel second sheet side 32. In a preferred embodiment, sheet member 21 is provided with raised bead 25 essentially parallel to the sheet sides 31 and 32 emanating outwardly from outer surface 12 of sheet member 21 and extending along substantially an entire length of sheet member 21. Raised bead 25 may be round, rectangular or other shape that prevents a tubular member to be fitted completely over coupling device 20. In a preferred embodiment, raised bead 25 is located generally in the center of outer surface 12 of coupling device 20. Arranged on either side of raised bead 25 and positioned over outer surface 12 of sheet member 21 are first gasket sealing covering 26 and second gasket sealing covering 27. First gasket sealing covering 26 is arranged adjacent raised bead 25 and first sheet edge 31 such that it encloses the entire length of sheet member 21 to include the overlapped first sheet end 28 and second sheet end 29. Second gasket sealing covering 27 is arranged adjacent raised bead 25 and second sheet edge 32 such that it encloses the entire length of sheet member 21 to include the overlapped first sheet end 28 and second sheet end 29.

FIG. 3A depicts an alternate embodiment in which abutment member 23 is fixedly attached to sheet member 21 proximate first sheet end 28 and female member 24 is movably connected to sheet member 21 proximate second sheet end 29. The term "movably attached" is defined as allowing female member 24 to move sufficiently to accommodate the angle at which male threaded member 22 contacts abutment member 23.

FIG. 4 is a fragmentary perspective view showing first sheet end 28 of sheet member 21 of the present invention. Female member 24 is fixedly attached proximate first sheet end 28 and centered on raised bead 25 of sheet member 21. Female member 24 is fixedly attached however, in the preferred embodiment, it should be understood that it is pivotably mounted to accommodate the pivot angle of male threaded member 22. Overlap gasket sealing cover 45 is securely mounted in a substantially transverse direction such that overlap gasket sealing cover is positioned between first sheet end 28 and overlapped second sheet end 29 (not shown) to form a fluid tight seal between the overlapped sheet ends 28 and 29. Overlap gasket sealing cover 45 may be mounted using suitable adhesives, rivets or other mounting methods well known to those skilled in the art.

FIG. 4A is cross section view of overlap gasket sealing cover 45 in which overlap gasket sealing cover 45 is seen to extend over raised bead 25 to sides 31 and 32. In a preferred embodiment, corners 45A of overlap gasket sealing cover 45 are thicker than the portions of overlap gasket sealing cover 45 that overlay raised bead 25 and outer surfaces 26 and 27 at first sheet end 28. The corners with increased thickness are at the intersection of raised bead 25 and outer surfaces 26 and 27. The preferred embodiment shown in FIG. 4A allows for a tight seal between first sheet end 28 and overlapping second sheet end 29 including those portions where overlapped raised bead 25 contact each other. Second sheet end 29 is not shown in FIG. 4A.

FIG. 4B depicts a more preferred embodiment in which the outer surface of that portion of overlap gasket sealing cover 45 that extends from between overlapped first sheet end 28 and second sheet end 29 is tapered to effect a secure seal between overlapped first sheet end 28 and second sheet end 29. 45B demonstrates a still more preferred embodiment in which the initial section of the outer surface of overlap gasket sealing cover 45 extends in a straight manner proximal to the tapered section.

FIG. 5 is an end view of the present invention illustrating first clip 34 and second clip 35 (two heavy duty spring clips) fixedly attached to the outside surface 12 of coupling device 20. In a preferred embodiment, first clip 34 and second clip 35 are angularly disposed with respect to one another about a circumference of the substantially cylindrically shaped coupling. First clip 34 and second clip 35 are arranged to secure the coupling device in position within the open end of tubular member 6. During the installation process, the clips hold the coupling device securely, thus eliminating the need for a second person to hold the device in place while second tubular member 7 is fitted onto coupling device 20. The clips also prevent the coupling device from being pushed "too far" into first tubular member 6 while second tubular member 7 is positioned. Although it should be appreciated that the type and position of the clips are an important part of the invention, it should be readily apparent that other suitable types of clips could be used to secure the coupling device prior to expansion, (such as a hook, clasp or double ended spring clip) and the clips could be positioned in a plurality of locations along the outside surface of coupling device 20.

FIG. 6 is a top view of a preferred embodiment of the present invention shown in FIG. 3 that further illustrates the position of first clip 34 and second clip 35. In a preferred embodiment, first clip 34 and second clip 35 are positioned so that apertures 9 are located above second gasket sealing covering 27. As shown in phantom in FIG. 6, first sheet end sheet end 28 and second sheet end 29 overlap one another in a preferred embodiment of the present invention.

FIGS. 7A and 7B are enlarged cross-sectional views of a preferred embodiment of the present invention taken generally along line 7—7 in FIG. 5. First sheet edge 31 and second sheet edge 32 of coupling device 20 are turned-up (furled) along the entire circumference of the coupling. Furled edges 31 and 32 reduce flow resistance of any fluid that travels through the tubular members that are coupled by coupling device 20 of the present invention. Furled edges 31 and 32 also reduce the possibility of any solid material or semi-solid getting "caught" on the edges, such as could happen in paper processing or other types of product processing systems. Also shown in FIGS. 7A and 7B in cross-section are first gasket sealing covering 26 and second gasket sealing covering 27 arranged on outside surface 12 of sheet member 21. It can be seen that bead 25 can have different configurations that allow for a raised bead that extends along most or all of the length of coupling device 20. In a preferred embodiment, first gasket sealing covering 26 and second gasket sealing covering 27 are placed around sheet member 21 to hold coupling device 20 in the overlapped position before and during a coupling operation.

FIGS. 8-15 best illustrate how to use the present invention. In these drawing figures, coupling device 20 is shown in operation coupling tubular members 6 and 7, respectively. In a first step, illustrated in FIG. 8, coupling device 20 is shown being brought into position inside of first tubular member 6. One person working alone, without moving a ladder, can easily and efficiently position, align and move coupling device 20 in the direction of arrow 36 into mating engagement with first tubular member 6.

FIG. 9 illustrates coupling device 20 positioned inside first tubular member 6 and arranged so that first clip 34 and second clip 35 are situated on the outside surface tubular member 6. In this position, the first clip 34 and second clip 35 are functioning to hold coupling device 20 securely in position with respect to tubular member 6. Once coupling device 20 is positioned inside first tubular member 6, second tubular member 7 is moved in the direction of arrow 37 and the open end of second tubular member 7 is positioned about the circumference of coupling device 20. Although in the preferred embodiment, there is no need for directly fastening the coupling device to the tubular members, screws or other insertion-type fasteners can be used in conjunction with the present invention. For example, one or more screws, rivets or other fasteners may be inserted through tubular members 6 and 7 opposite expansion assembly 30 and in other positions around the circumference of tubular members 6 and 7. In FIG. 9, arrows 39 and 40 illustrate the direction screws are driven through apertures 9 of the first and second clips to additionally secure device 20 to tubular member 6. In the prior art, the use of screws is a cause of air leaks. However, in the present invention a seal is provided by gasket sealing covers 26 and 27, and air leaks are avoided because the apertures of first clip 34 and second clip 35 are situated over second gasket sealing covering 27. In a preferred embodiment, the gasket sealing coverings 26 and 27 are formed of an elastomeric material (rubber strips, or strips of another flexible, elastomeric product) and are positioned over outer surface 12 of the sheet member arranged adjacent raised bead 25 and enclose the entire length of the outer perimeter of coupling device 20 when first sheet end 28 and second sheet end 29 are overlapped, to include the overlapped first sheet end 28 and second sheet end 29. A quality seal is maintained as screws are driven through the elastomeric product. As described below and depicted in FIGS. 16 and 17, gasket sealing coverings 26 and 27 are adapted to lie adjacent to and be compressed against the inside walls 6A and 7A of first tubular member 6 and second tubular member 7, respectively. Both gasket sealing coverings 26 and 27 extend entirely around coupling device 20 in the overlapped position to ensure a quality seal.

FIG. 10 is a fragmentary top view of tubular members 6 and 7 coupled with the present invention. In the preferred embodiment, coupling device 20 has raised bead 25 emanating outwardly from the outer surface and extending along substantially an entire length of sheet member 21. FIG. 10 illustrates coupled tubular members 6 and 7 aligned adjacent to raised bead 25, expansion assembly 30 attached to round bead 25, and first clip 34 and second clip 35 positioned outside the coupled tubular member 6.

Figure 11:
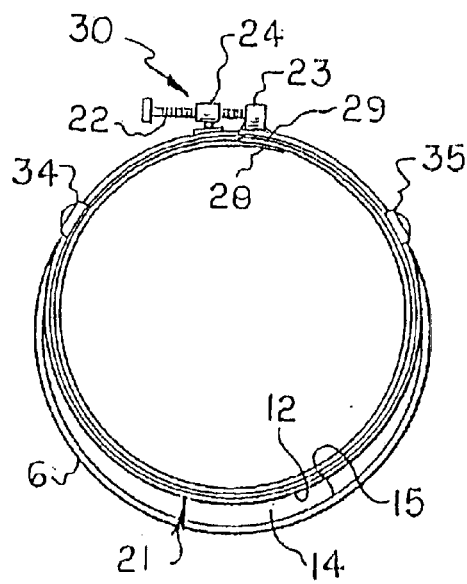
FIG. 11 is an end view of the present invention shown prior to expansion, which view is taken generally along line 11—11 in FIG. 9.

FIG. 11 is an end view of the present invention shown prior to expansion, which view is taken generally along line 11—11 in FIG. 9. Sheet member 21 is positioned inside the open end of first tubular member 6 and expansion assembly 30 is positioned outside open end of tubular member 6. Male threaded member 22 is in a pre-expansion position. This view also shows an internal space 14 between inside wall 15 of tubular member 6 and outside surface 12 of the coupling device of the present invention prior to expansion.

Figure 12:
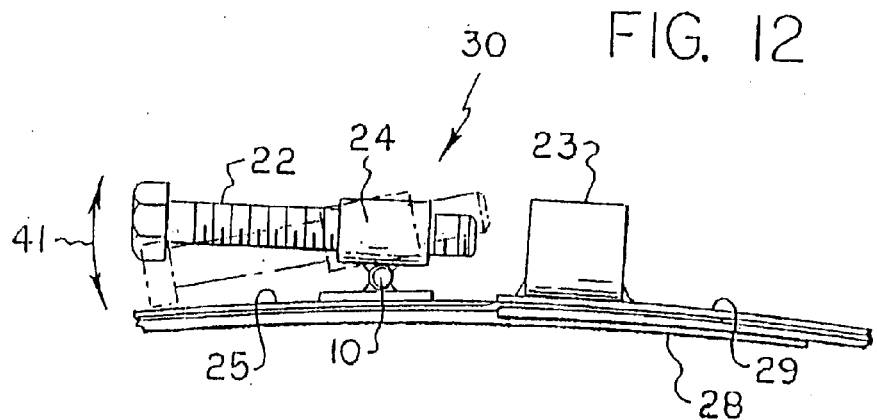
FIG. 12 is an enlarged side view of the expansion assembly of the present invention depicting movement of the male threaded member about a pivot point.

FIG. 12 is an enlarged side view of expansion assembly 30 of the present invention depicting movement of male threaded member 22 about pivot point 10. This expansion assembly accommodates initiation of the coupling process by providing a means of coupling irrespective of the slight variances in diameter between the tubular members to be coupled and the coupling device itself. More specifically, the pivoting mechanism described below accommodates initial alignment of the coupling device during the beginning of the coupling process.

In a preferred embodiment female member 24 is a threaded channel, nut, bushing or other guide pivotably mounted to raised bead 25 located proximate first sheet end 28, (the under-lapped sheet end that forms the coupling cylinder) and abutment member 23 (a non-threaded nut or receiving cylinder or chamber) is affixed to raised bead 25 located along the top portion of second sheet end 29 (the overlapped portion of the sheet that forms the coupling cylinder). Male threaded member 22, such as a threaded bolt or screw, is arranged to threadably engage female member 24 and to abut abutment member 23. The inner diameters of abutment member 23 and female member 24 are larger than the outer diameter of male threaded member 22 to allow the abutment member and the female member to accept the male threaded member when it is threaded through female member 24 and engaged with abutment member 23. In a preferred embodiment, female member 24 is operatively arranged to pivot about pivot point 10. Male member 22 is operatively arranged to be threaded through female member 24 and thus pivot in opposing directions as depicted by arrow 41 in FIG. 12. This pivoting motion permits male threaded member 22 to engage abutment member 23.

Figure 12A:
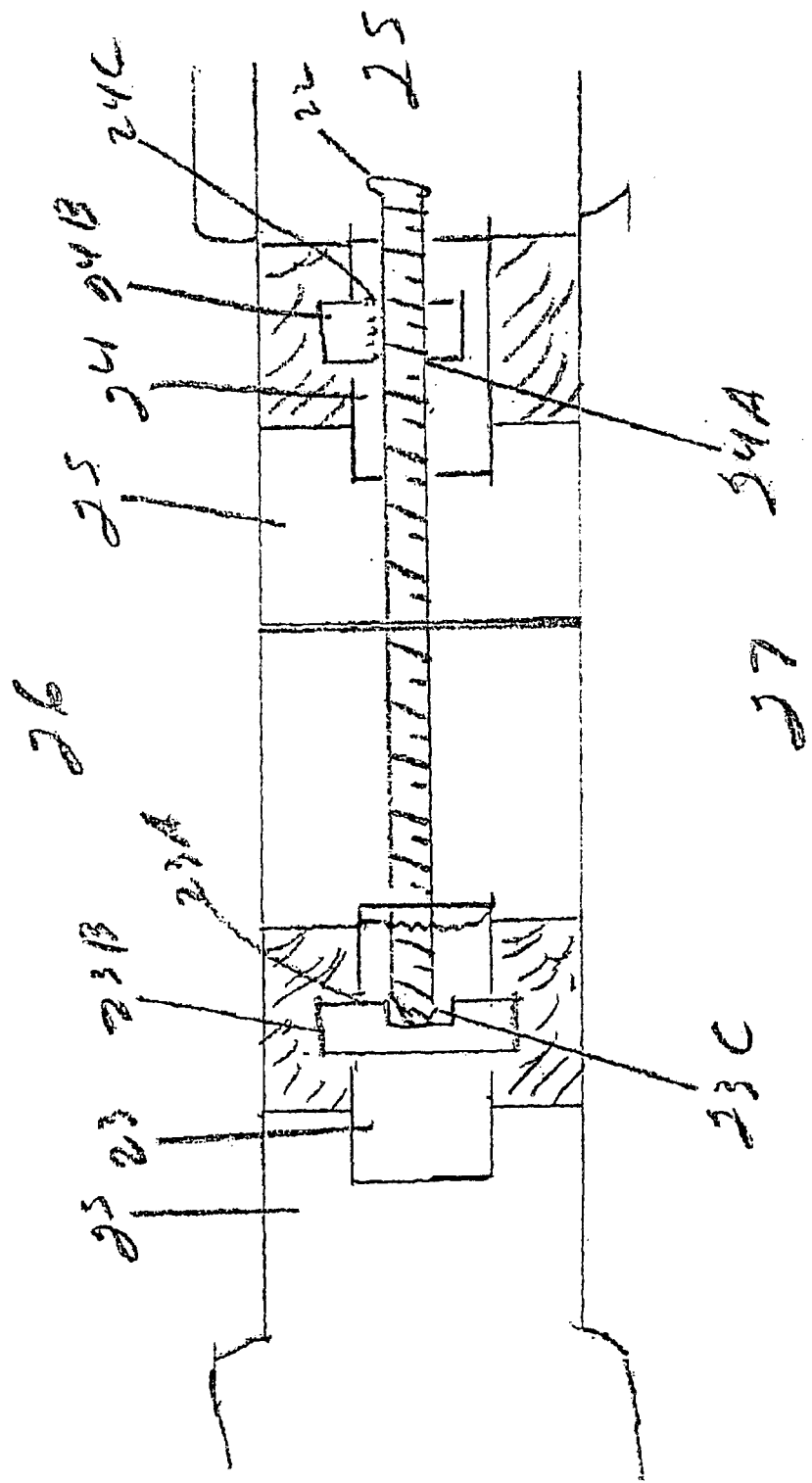
FIG. 12A is an enlarged view of an alternate embodiment of the expansion assembly of the present invention depicting a slidably moving abutment member and a slidably moving female member

FIG. 12A depicts a side view of an alternate embodiment of abutment member 23. Abutment member 23 mounted on raised bead 25 defines holes 23A located n opposite sides of abutment member 23. Abutment unit 23B movably extends through holes 23A in a transverse direction relative to raised bead 25. In a preferred embodiment, abutment unit 23B comprises abutment cavity 23C. Preferably, the width, or inner diameter, of abutment cavity 23C is slightly wider in width than threaded male member 22. Threaded male member 22 extends into and abuts abutment cavity 23C.

FIG. 12A also depicts an alternate embodiment of female member 24. Similar to abutment 23, female member 24 mounted on raised bead 25 defines holes 24A located on opposite sides of female member 24. Engagement unit 24B movably extends through holes 24A in a transverse direction relative to raised bead 25. Threaded orifice 24C extends through engagement unit 24B. Preferably, the inner diameter of orifice 24C is slightly wider than threaded male member 22 to allow orifice 24C to accept threaded male member 22 when it is threaded through orifice 24C to extend from female member 24 to abutment cavity 223C in abutment member 23. It will be recognized by those skilled in the art that the movement of abutment unit 23B and engagement unit 24B through holes 23A and orifices 24A, respectively, permits male threaded member 22 to approach and engage abutment cavity 23C in abutment member 23 a different angles from female member 24. It will also be recognized that different embodiments of abutment members 23 and female members 24 may be utilized to permit joining of abutment members 23 and female members 24 when they are positioned at different angles.

Figure 13:
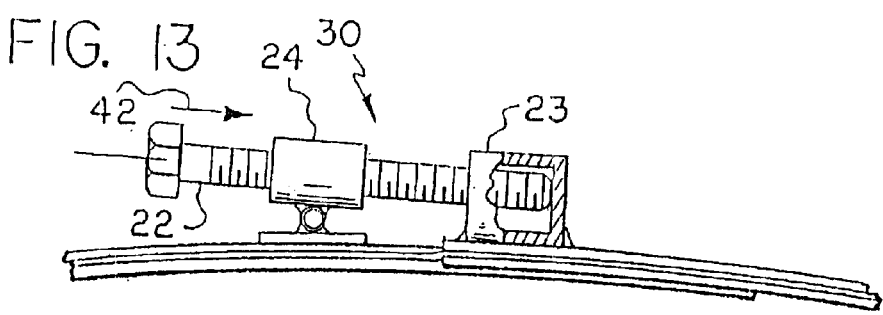
FIG. 13 is an enlarged elevated fragmentary side view of the expansion assembly of the present invention, with a portion of the abutment member cut away, shown prior to expansion.

FIG. 13 is an enlarged elevated fragmentary side view of expansion assembly 30 of the present invention, with a portion of abutment member 23 cut away, shown prior to expansion. Male threaded member 22 is rotated in a first (clockwise) direction causing it to move in the direction shown by arrow 42 and thus engaging abutment member 23. This cut away view of abutment member 23 shows how male threaded member 22 enters and abuts against abutment member 23. It should be appreciated that abutment member 23 and female member 24 can comprise any structure suitably configured and constructed to thus engage the threaded member (such as a threaded nut pivotably attached as the abutment member and a non-threaded member fixedly attached in place of female member 24, or different combinations of the same, for example).

Figure 14:
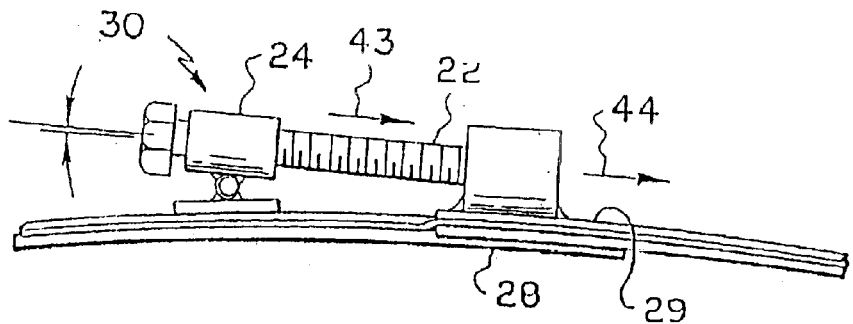
FIG. 14 is an enlarged elevated fragmentary side view of the expansion assembly of the present invention taken after expansion.

FIG. 14 is an enlarged elevated fragmentary side view of expansion assembly 30 of the present invention taken after expansion. In the preferred embodiment of the present invention, male threaded member 22 is screwed through female member 24 to abut abutment member 23 (using a socket wrench, hex-head nut driver, or a cordless drill, for example) and the overlapping first sheet end 28 and second sheet end 29 of the coupling device are forced to move in opposite directions, that is, the edges of the overlapping first sheet end 28 and second sheet end 29 move toward each other, thus forcing the coupling device to expand, so that the diameter of the cylinder can be increased or decreased by decreasing or increasing the amount of overlap of the first sheet end 28 and second end 29. FIG. 14 shows male threaded member 22 fully threaded in female member 24 in the direction of arrow 43. As the male threaded member pushes abutment member 23 in the direction of arrow 44 the coupling device expands (to a greater diameter) by moving second sheet end 29 in direction of arrow 44.

Figure 15:
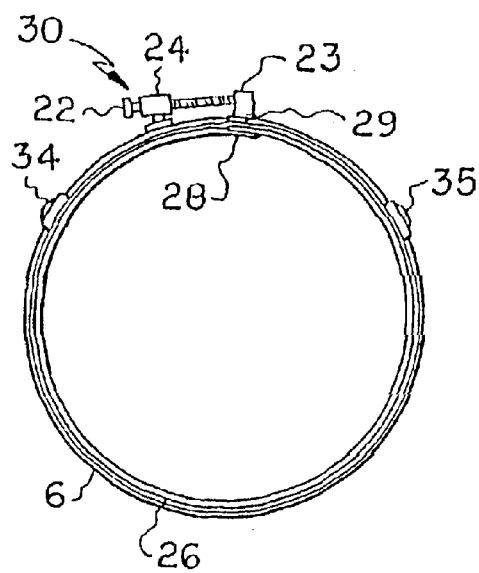
FIG. 15 is an elevated end view of the present invention taken after expansion.

FIG. 15 is an end view of the present invention shown after expansion. Second sheet end 29 is urged toward first sheet end 28 by fully extended male threaded member 22 butting against abutment member 23, thereby increasing the diameter of the coupling device. In a preferred embodiment, when the present invention is in the expanded condition, the exterior gasket sealing covers 26 and 27 are pressed against the inside walls of the tubular members as shown in FIG. 15.

Figure 16:
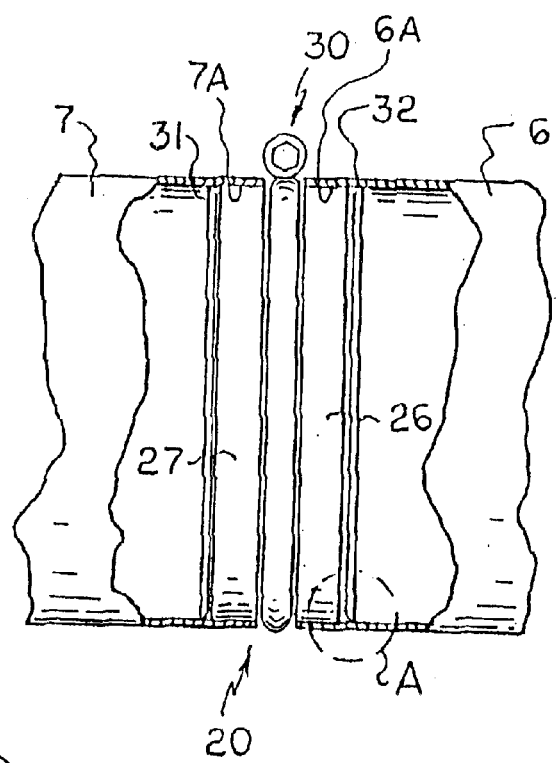
FIG. 16 is a fragmentary side view of the present invention, with a portion of the tubular members cut away, shown as the device is in position coupling a pair of tubular members.

FIG. 16 is a fragmentary side view of the present invention, with a portion of the tubular members cut away, shown as the device is in position coupling a pair of tubular members 6 and 7, respectively. Coupling device 20 is illustrated in the expanded condition and the external edges of the coupling device are pressed firmly against the inside walls 6A and 7A of the tubular members 6 and 7, respectively.

Figure 17:
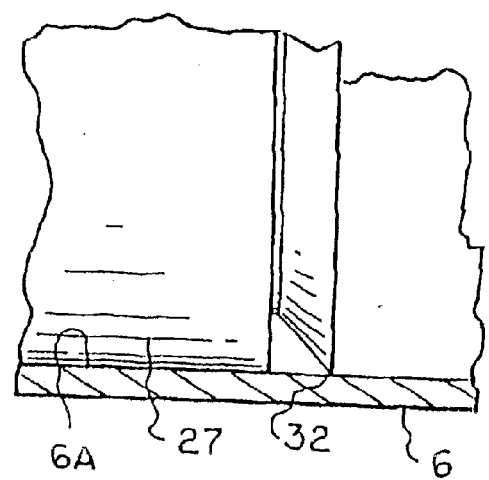
FIG. 17 is an enlarged view of the coupling and tubular member shown in section A of FIG. 16, illustrating the furled edge of second sheet edge.

FIG. 17 is an enlarged view of the coupling and tubular member shown in section A of FIG. 16, illustrating the furled edge of second sheet edge 32. The furled edges reduce flow resistance of any fluid that travels through the pipes that are coupled by the coupling devices of the present invention. The furled edges also reduce the possibility of any solid material getting "caught" on the edges, such as could happen in paper processing.

Figure 18:
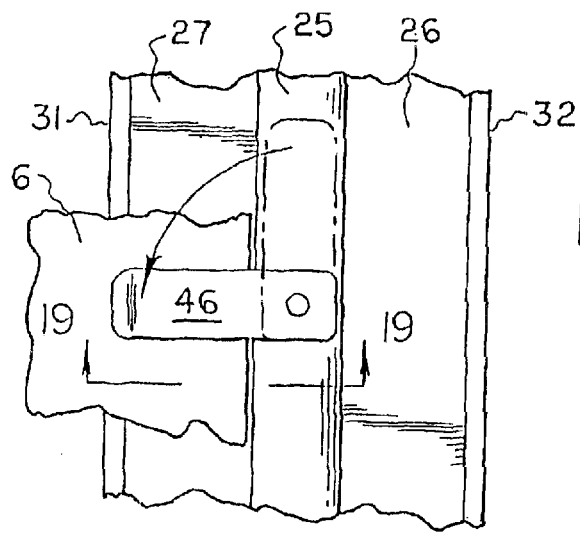
FIG. 18 is a fragmentary top view of a pivot clip situated on the outside surface of a tubular member.
Figure 19:
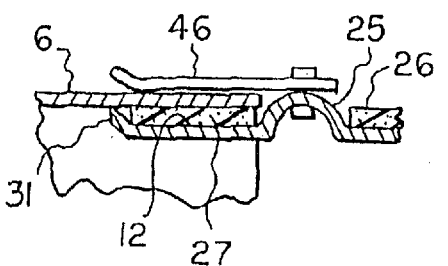
FIG. 19 is a cross-sectional view of the pivot clip taken generally along line 18—18 in FIG. 18.

FIGS. 18 and 19 demonstrate pivot type clip 46 positioned to hold tubular member 6 in place during a coupling operation. The position of pivot type clip 46 before use is shown in phantom. FIG. 19 shows a cross-section view of pivot type clip 46 positioned to hold tubular member 6 in place. Also shown is first gasket sealing cover 26 located between tubular member 6 and contacting outer surface 12 to form a fluid tight seal. In addition, FIG. 19 depicts furled edge 31 in contact with tubular member 6.

Figure 20:
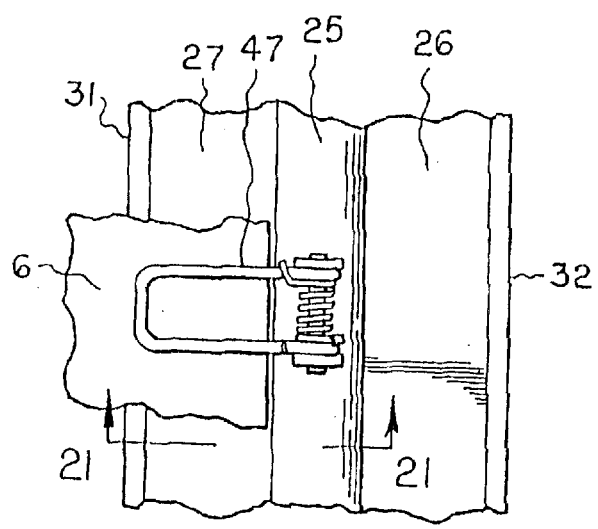
FIG. 20 is a fragmentary top view of a flip-type clip situated on the outside surface of a tubular member; and, FIG. 21 is a cross-sectional view of the flip-type clip taken generally along line 20—20 in FIG. 20.
Figure 21:
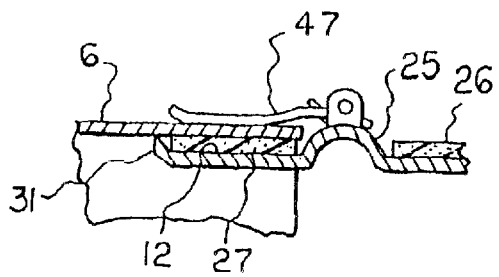

FIG. 20 demonstrates flip type clip 47 positioned to hold tubular member 6 in place during a coupling operation. FIG. 21 shows a cross-section view of flip type clip 47 positioned to hold tubular member 6 in place. Also shown is first gasket sealing cover 26 located between tubular member 6 and contacting outer surface 12 to form a fluid tight seal. In addition, FIG. 21 depicts furled edge 31 in contact with tubular member 6.

As will be appreciated, the present invention provides a sound and effective and easy to implement coupling system. The invention overcomes some of the deficiencies in the prior art by allowing one person to efficiently couple tubular members. It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings, shall be interpreted as illustrative and not in a limiting sense. It is also to be understood that the following claims are intended to cover all the generic and specific features of the invention herein described, and all statements of the scope of the invention that, as a matter of language, might be said to fall therebetween.

What is claimed is:

1. A device for coupling tubular members comprising:
   a sheet member having a first end and a second end where said first end and said second end are operatively arranged to overlap one another to form a substantially cylindrically shaped coupling;
   an abutment member mounted to said sheet member proximate said second end thereof;
   a male threaded member;
   a movable female member mounted proximate said first end of said sheet, where said female member is arranged to threadably engage said threaded male member, and said male member is operatively arranged to abut said abutment member, wherein said male threaded member is operatively arranged to rotate in a first direction to abut said abutment member and expand said substantially cylindrically shaped coupling, and;

at least one clip fixedly attached to an outer surface of said substantially cylindrically shaped coupling, wherein said clip functions to hold said device in engagement with said tubular members during coupling.

2. The device for coupling tubular members recited in claim 1 wherein said female member is slidably mounted.

3. The device for coupling tubular members recited in claim 1 further comprising a gasket seal mounted to said outer surface of said sheet member in a substantially transverse configuration, wherein said gasket seal is positioned between said first end of said sheet member and said second end of said sheet member when said first end and said second end are operatively arranged to overlap one another to form a substantially cylindrically shaped coupling.

4. The device for coupling tubular members recited in claim 3 wherein said gasket seal mounted to said outer surface in a transverse configuration further comprises increased thickness at least one intersection of said raise bead and said outer surface.

5. The device for coupling tubular members recited in claim 4 wherein said gasket seal mounted to said outer surface in a transverse configuration extends out from between said overlapped first sheet end and said second sheet end.

6. The device for coupling tubular members recited in claim 5 wherein an outer surface of a portion of said gasket seal mounted to said outer surface in a transverse configuration is tapered.

7. The device for coupling tubular members recited in claim 1 further comprising at least one insertion-type fastener.

8. The device for coupling tubular members recited in claim 7 wherein said insertion-type fastener is a screw.

9. The device for coupling tubular members recited in claim 7 wherein said insertion-type fastener is a rivet.

10. A device for coupling tubular members comprising:

a sheet member having a first end and a second end where said first end and said second end are operatively arranged to overlap one another to form a substantially cylindrically shaped coupling;

an abutment member mounted to said sheet member proximate said first end thereof;

a male threaded member;

a movable female member mounted proximate said second end of said sheet, where said female member is arranged to threadably engage said threaded male member, and said male member is operatively arranged to abut said abutment member, wherein said male threaded member is operatively arranged to rotate in a first direction to abut said abutment member and expand said substantially cylindrically shaped coupling, and;

at least one clip fixedly attached to an outer surface of said substantially cylindrically shaped coupling, wherein said clip functions to hold said device in engagement with said tubular members during coupling.

11. The device for coupling tubular members recited in claim 10 wherein said female member is pivotable mounted and arranged for pivoting rotation around a pivot point.

12. The device for coupling tubular members recited in claim 10 wherein said female member is slidably mounted.

13. The device for coupling tubular members recited in claim 10 wherein said at least one clip comprises a first clip and a second clip angularly disposed with respect to one another about a circumference of said substantially cylindrically shaped coupling.

14. The device for coupling tubular members recited in claim 10 wherein said sheet member further comprises a first furled edge and a second furled edge.

15. The device for coupling tubular members recited in claim 10 wherein said sheet member comprises a raised bead emanating outwardly from said outer surface and extending along substantially an entire length of said sheet member.

16. The device for coupling tubular members recited in claim 15 wherein said raised bead is round.

17. The device for coupling tubular members recited in claim 15 wherein said raised bead is rectangular.

18. The device for coupling tubular members recited in claim 14 further comprising at least one gasket sealing covering positioned over said outer surface of said sheet member arranged adjacent said raised bead and extending along substantially said entire length of said sheet member.

19. The device for coupling tubular members recited in claim 18 wherein said at least one gasket sealing covering comprises a first gasket sealing covering arranged adjacent said raised bead and covering a first portion of said substantially entire length of said sheet member and a second gasket sealing covering arranged adjacent said raise bead and covering a second portion of said substantially entire length of said sheet member.

20. The device for coupling tubular members recited in claim 10 further comprising a gasket seal mounted to said outer surface of said sheet member in a substantially transverse configuration, wherein said gasket seal is positioned between said first end of said sheet member and said second end of said sheet member when said first end and said second end are operatively arranged to overlap one another to form a substantially cylindrically shaped coupling.

21. The device for coupling tubular members recited in claim 20 wherein said gasket seal mounted to said outer surface in a transverse configuration further comprises increased thickness at least one intersection of said raise bead and said outer surface.

22. The device for coupling tubular members recited in claim 20 wherein said gasket seal mounted to said outer surface in a transverse configuration extends out from between said overlapped first sheet end and said second sheet end.

23. The device for coupling tubular members recited in claim 22 wherein an outer surface of a portion of said gasket seal mounted to said outer surface in a transverse configuration is tapered.

24. The device for coupling tubular members recited in claim 10 wherein said at least one clip is a spring clip.

25. The device for coupling tubular members recited in claim 10 wherein said at least one clip is a pivot clip.

26. The device for coupling tubular members recited in claim 10 wherein said at least one clip is a flip-type clip.

27. The device for coupling tubular members recited in claim 10 further comprising at least one insertion-type fastener.

28. The device for coupling tubular members recited in claim 27 wherein said insertion-type fastener is a screw.

29. The device for coupling tubular members recited in claim 27 wherein said insertion-type fastener is a rivet.

* * * * *